(12) United States Patent
Gebhard

(10) Patent No.: US 7,862,197 B2
(45) Date of Patent: Jan. 4, 2011

(54) SEARCHLIGHT WITH FLEXIBLE ATTACHMENT MEANS

(75) Inventor: Albert W. Gebhard, Devner, CO (US)

(73) Assignee: Golight, Inc., Culbertson, NE (US)

( * ) Notice: Subject to any disclaimer, the term of this patent is extended or adjusted under 35 U.S.C. 154(b) by 270 days.

(21) Appl. No.: 12/209,497

(22) Filed: Sep. 12, 2008

(65) Prior Publication Data

US 2010/0067234 A1 Mar. 18, 2010

(51) Int. Cl.
*F21L 4/00* (2006.01)
(52) U.S. Cl. ............... 362/191; 362/398; 248/683; 248/206.5; 248/309.4
(58) Field of Classification Search ......... 362/190, 362/191, 389, 398; 248/683, 188.3, 206.5, 248/309.4
See application file for complete search history.

(56) References Cited

U.S. PATENT DOCUMENTS

| 2,641,793 | A | * | 6/1953 | Wilm .................. 16/435 |
| 4,428,033 | A | | 1/1984 | McBride |
| 4,506,317 | A | | 3/1985 | Duddy |
| 4,890,207 | A | | 12/1989 | Jones |
| 4,907,769 | A | | 3/1990 | Hunley, Jr. et al. |
| 4,965,708 | A | | 10/1990 | Louis |
| 5,228,770 | A | | 7/1993 | Brunson |
| 5,457,614 | A | | 10/1995 | Duty |
| 5,490,046 | A | | 2/1996 | Gohl et al. |
| 5,499,167 | A | | 3/1996 | Brown |
| 5,584,560 | A | | 12/1996 | Gosswiller et al. |
| 5,673,989 | A | | 10/1997 | Gohl et al. |
| 5,816,684 | A | | 10/1998 | Yu |
| 6,305,819 | B1 | * | 10/2001 | Chen .................. 362/186 |
| 6,491,271 | B1 | * | 12/2002 | Adams .............. 248/206.5 |
| 6,592,241 | B1 | | 7/2003 | Kovacik et al. |
| 6,709,121 | B1 | | 3/2004 | Lowe et al. |
| 6,749,166 | B2 | | 6/2004 | Valentine et al. |
| 7,163,312 | B2 | | 1/2007 | Woodyard |
| 7,249,864 | B2 | | 7/2007 | Smith et al. |
| 7,624,957 | B2 | * | 12/2009 | Klein .............. 248/206.5 |

(Continued)

FOREIGN PATENT DOCUMENTS

CA 2499836 4/2004

(Continued)

OTHER PUBLICATIONS

International Search Report and Written Opinion of the International Searching Authority for related International Application No. PCT/US2009/056533 mailed Apr. 26, 2010 (11 pages).

*Primary Examiner*—Terrell Mckinnon
*Assistant Examiner*—Bradley H Duckworth
(74) *Attorney, Agent, or Firm*—Margaret Polson; Oppedahl Patent Law Firm LLC

(57) ABSTRACT

A flexible attachment means for use with a searchlight or other device is disclosed. The flexible attachment means allows a user to attach a housing to an uneven metallic surface, such as a car hood, boat prow or other locations. The flexible attachment means has an attachment base fixed to the bottom of a housing for the searchlight. The attachment base has attachment locations that flexibly attach to a flexible base gasket having a plurality of magnets to hold the flexible attachment means to a metallic surface.

17 Claims, 4 Drawing Sheets

U.S. PATENT DOCUMENTS

| | | |
|---|---|---|
| 2004/0094686 A1 | 5/2004 | Hsien |
| 2006/0139927 A1 | 6/2006 | Kovacik et al. |
| 2006/0232985 A1 | 10/2006 | Wang |
| 2008/0019116 A1 | 1/2008 | LeBlanc et al. |
| 2009/0166497 A1 * | 7/2009 | Carnevali ................ 248/309.4 |

FOREIGN PATENT DOCUMENTS

| | | |
|---|---|---|
| CA | 2498388 | 8/2006 |
| CN | 200520015458 | 12/2006 |
| JP | 2005-116491 | 4/2005 |
| KR | 20-0406709 | 1/2006 |

* cited by examiner

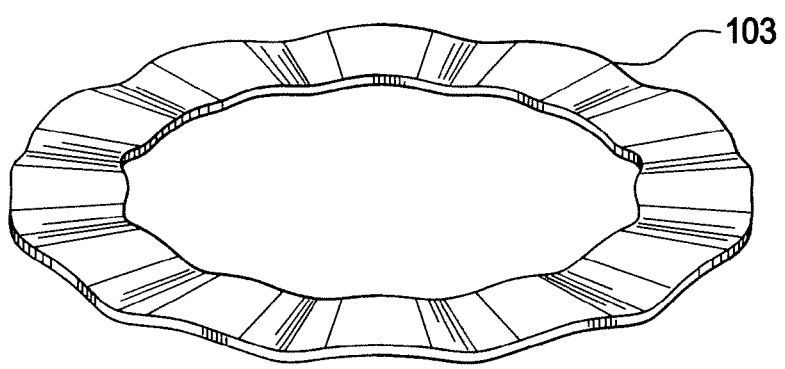
FIG.2
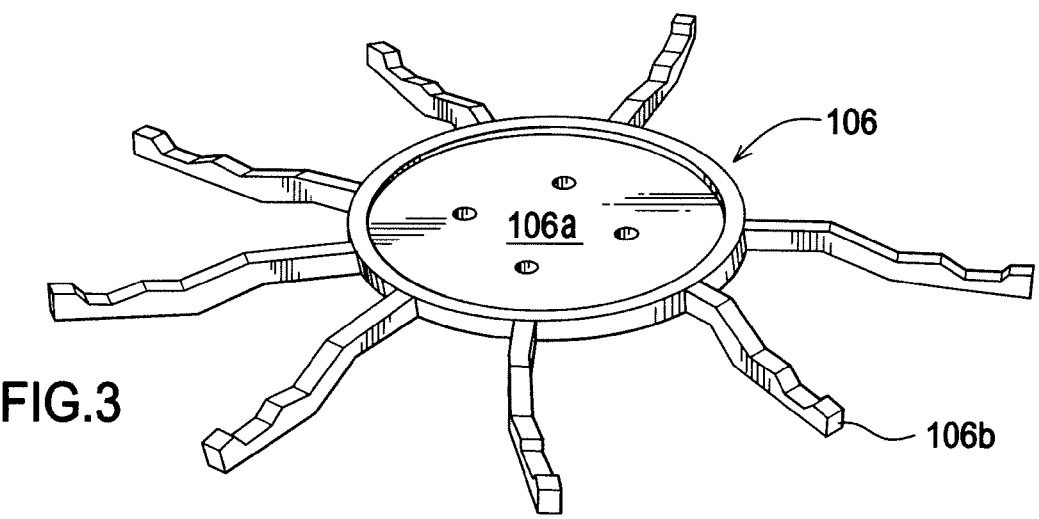
FIG.3
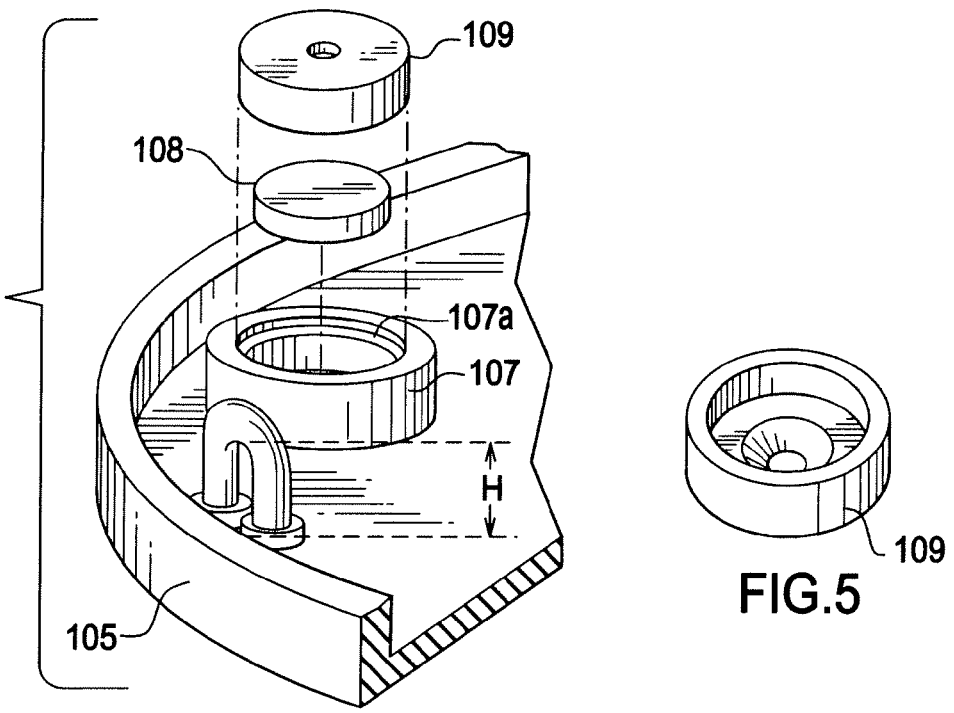
FIG.4
FIG.5

SEARCHLIGHT WITH FLEXIBLE ATTACHMENT MEANS

BACKGROUND

Rotating searchlights are well known the art, and many of them have mounting mechanisms that allow the user to removably mount the searchlight on a car or other device. Exemplary patents include U.S. Pat. No. 5,490,046 and U.S. Pat. No. 5,673,989. Although both these patents disclose ways to removably mount a searchlight, the mounting methods have various drawbacks, the largest being that none of them work well on irregular surfaces.

Another issue with rotating searchlights is the rotation of the upper light portion on base creates wear between the parts that move. Although bearings and such are well known, most of them have known disadvantages in long term wear and are complex, with many parts that can wear out over time.

The foregoing example of the related art and limitations related therewith are intended to be illustrative and not exclusive. Other limitations of the related art will become apparent to those of skill in the art upon a reading of the specification and a study of the drawings.

SUMMARY

One aspect of the present invention to provide a magnetic base that is flexible enough to allow the searchlight or other device to be securely mounted on an uneven surface.

Another aspect of the present invention is to provide a suspension and bearing assembly that reduces wear and friction, while providing a spring like action to take up the tolerance between the moving parts.

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

A flexible attachment means is disclosed for mounting a searchlight or other device on to an irregular metal surface. The flexible attachment means has an attachment base attached to the base of the searchlight. The attachment base has attachment locations to connect a flexible base gasket that holds the magnets to the attachment base in a flexible manner. The attachment locations allow the base gasket to move a given distance away from the base member to allow the base gasket to conform to an irregular metallic surface. Also disclosed is a wave washer which functions as a suspension bearing assembly.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

FIG. 2 is a perspective view of wave washer.

FIG. 3 is a perspective view of the attachment base.

FIG. 4 is an exploded view of a magnet assembly.

FIG. 5 is a perspective view of the underside of the magnet cap.

Before explaining the disclosed embodiment of the present invention in detail, it is to be understood that the invention is not limited in its application to the details of the particular arrangement shown, since the invention is capable of other embodiments. Exemplary embodiments are illustrated in referenced figures of the drawings. It is intended that the embodiments and figures disclosed herein are to be considered illustrative rather than limiting. Also, the terminology used herein is for the purpose of description and not of limitation.

DETAILED DESCRIPTION OF THE DRAWINGS

Figure 1:
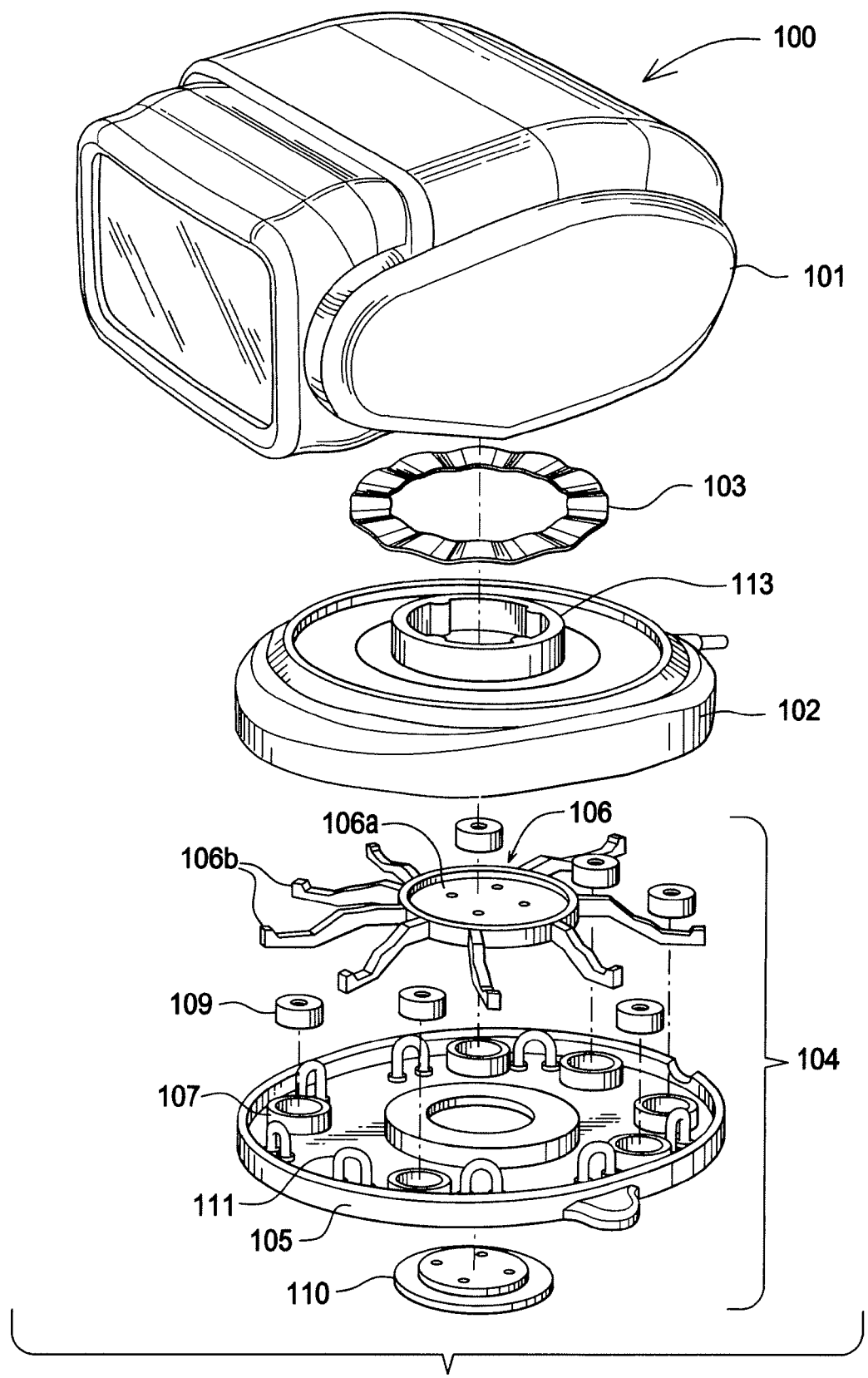
FIG. 1 is an exploded view of the relevant components of the searchlight.
Figure 8:
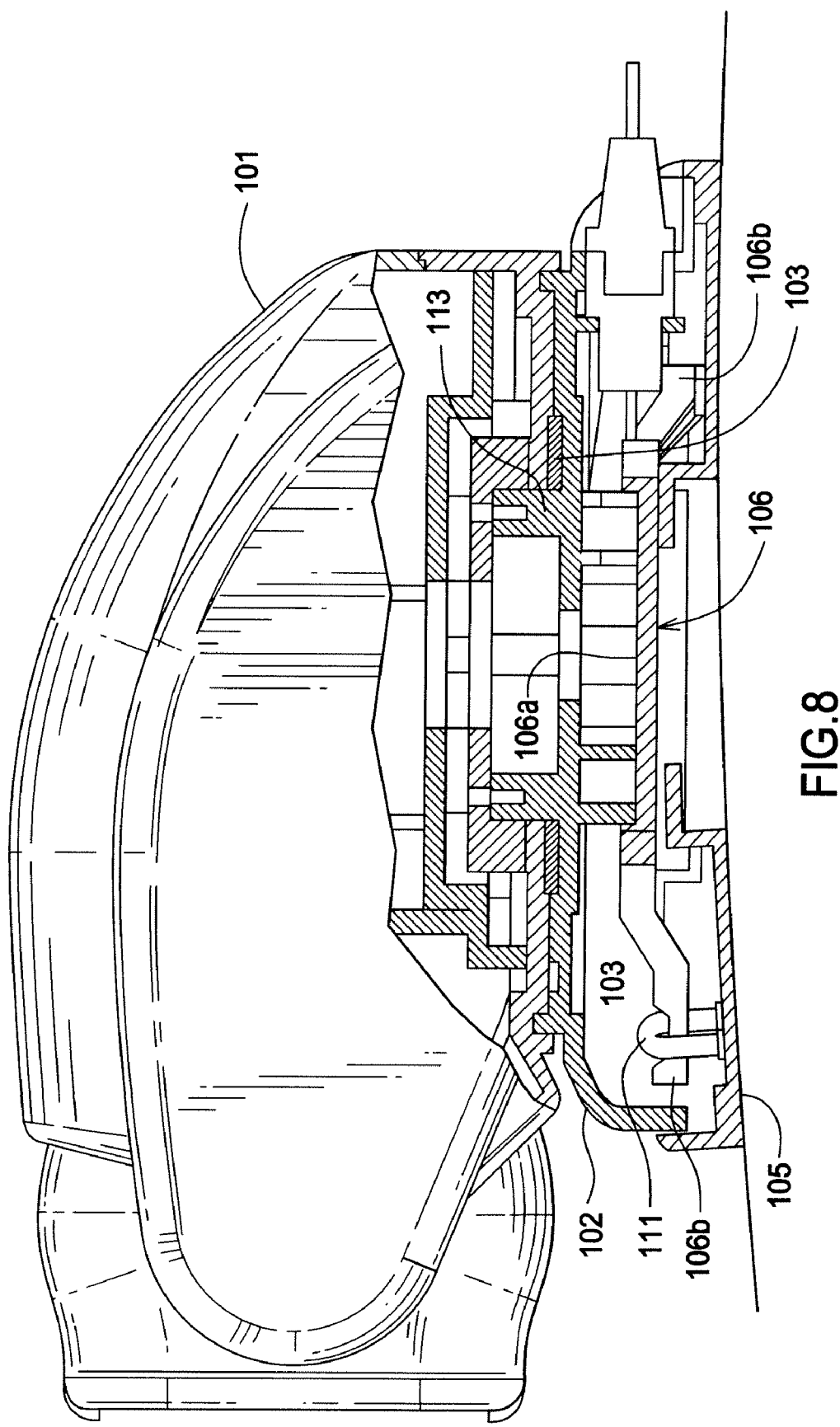
FIG. 8 is a partially cut away view of the searchlight.

Referring first to FIG. 1, the rotating searchlight 100 has a main housing 101, which holds the light and the relevant motors for operation. As these are well known in the art, they are not shown. The main housing 101 is rotatably mounted in base 102, with wave washer 103 compressed between the base 102 and the housing 101. The base 102 is substantially rigid, providing the fixed base for the rotation of the light and the attachment point for the flexible attachment means 104. In the disclosed embodiment, the flexible attachment means has a base gasket 105 and an attachment base 106 which are both fixed to the base 102 at center section 113 via a base plate 110 and screws or other fasteners, as seen in FIG. 8. The base gasket 105 is formed of a water proof flexible material and has magnet mounts 107.

The disclosed embodiment is shown and discussed in terms a searchlight with a flexible attachment means. It is to be understood that the device is not limited to a searchlight, any portable device that a user wishes to removably mount on a metallic surface could use a flexible attachment means as disclosed.

In the depicted embodiment the magnet mounts 107 are formed as small cups to receive the magnets 108 (rare earth magnets in the depicted embodiment) and the steel energy director caps 109 as best seen in FIGS. 4 and 5. The magnets 108 and the caps 109 are held into the magnet mounts 107 by the elasticity of the base gasket 105 and, if desired, small rims 107a on the magnet mounts 107. The number, spacing, size and shape of the magnets 108 and corresponding mounts 107 can be changed, depending upon the application. Other methods of attaching the magnets 108 to the base gasket 105 include forming the magnets into the base gasket 105, gluing, heat bonding and other methods known in the art.

The attachment base 106 has plate 106a which functions to allow the attachment base 106 to be fixed to the base 102 and provide a center point for the arms 106b. The attachment base 106 and the arms are largely rigid in most embodiments, and provide little of the flexion. If desired, the arm 106b could be designed with some flexibility. The attachment base can be a ridged yet resilient material such as ABS plastic or nylon. It could be made of steel, brass or any variety of mostly rigid materials.

The arrangement and number of the arms 106b will depend on the application of the flexible attachment means. In the depicted embodiment the arms are arranged asymmetrically around the plate 106a, with more arms 106b to one side, which will be oriented to the front of the vehicle when the rotating spot light is in use. This arrangement allows the flexible attachment means to handle the forces generated by the forward movement and stopping action of the vehicle. Other arrangement and number of arms can be chosen for other intended uses.

Figure 7:
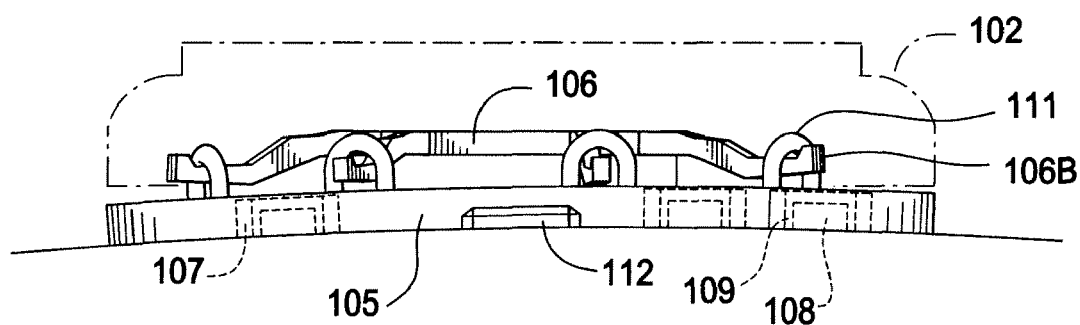
FIG. 7 is a cross sectional view of the bottom gasket taken along line 6-6.

As seen in FIGS. 5 and 7 the base gasket 105 attaches to the attachment base 106 by the anchors 111 going over ends of arms 106b. In the depicted embodiment the anchors are formed as mounting loops. The anchors 111 have sufficient height H to allow the base gasket 105 to pull away from the base 102 in individual locations as shown in FIGS. 7 and 8. In another embodiment, not shown, the base 102 can have hooks depending from its bottom surface to attach to the anchors 111, or other similar shapes to act as attachment locations. Depending on the particular embodiment, the anchors 111 can be elastic for additional flexibly.

Figure 6:
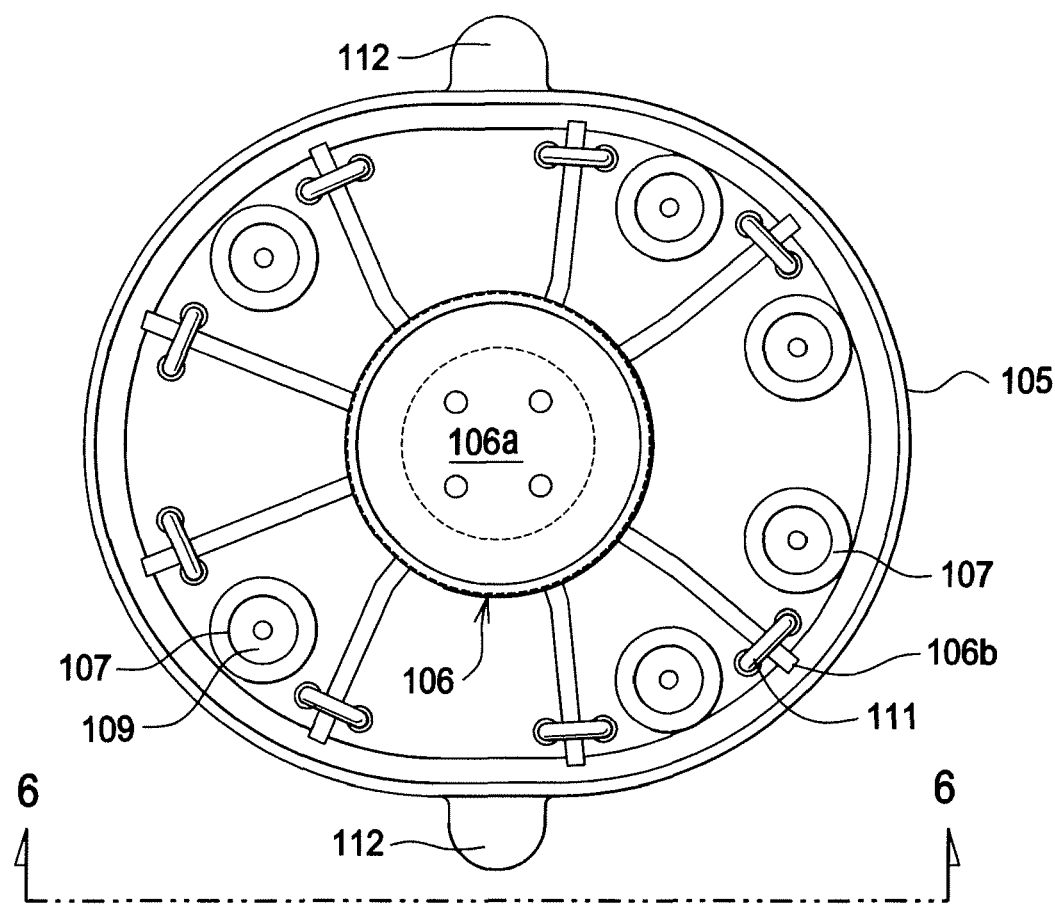
FIG. 6 is a top plan view of the bottom gasket with the flexing means shown in dotted lines.

As seen in FIG. 7, the base gasket 105 is flexible enough to allow each anchor 111 to be at a different height on the arm 106b, allowing the flexible attachment means 104 to attach the searchlight, or other desired object, to a highly irregular metallic surface. The base gasket 105 has a smooth bottom surface, best seen in FIG. 8, for maximum friction on the metallic surface to reduce the likelihood of the searchlight sliding on the metal surface during use. Tabs 112 can be provided on base gasket 105 to allow for easier removal of the flexible attachment means from the metal surface, as shown in FIG. 6. Base gasket 105 can be made from any suitable flexible polymer, injection moldable thermo plastic rubber is believed to be suited for this purpose. Also believed to be suitable are rubber, silicone PVC, and similar materials.

Referring to FIG. 8, the wave washer 103 is compressed between the housing 101 and the base 102 to form a suspension bearing assembly to promote the smooth rotation of the light on the base 102 around center section 113 of base 102. The center section 113 of base 102 is reinforced to take the forces generated by the rotation of the light and the transfer of forces from the flexible attachment means 104 via the attachment base 106. The wave washer 103 is compress to approximately half of its starting height, putting the system in tension and taking up the space needed between the two moving parts. The wave washer 103 is composed of acetal resin (Delrin®) in the disclosed embodiment. Other high lubricity, high wear materials would work as well. The wave design allows for only partial contact between the parts which reduces friction and potential wear. The design also allows for the natural accumulation of debris to be pushed out of the way, to reduce the wear on the moving parts.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations are within their true spirit and scope. Each apparatus embodiment described herein has numerous equivalents

I claim:

1. A rotating light comprising:
a housing having a light, said housing rotating on a base;
a attachment base having a plate and a plurality of attachment locations on the plate;
the attachment base fixed to the base at the plate;
a flexible base gasket having a plurality of magnets mounted therein and a plurality of anchors; said attachment locations connected to the anchors to attach the attachment base to the base gasket; and
wherein the connection of the attachment locations and the anchors have enough play such that the flexible base gasket can move a distance away from the attachment base becoming at least partially non-planar.

2. The rotating light of claim 1 wherein the anchors are flexible allowing the distance to increase.

3. The rotating light of claim 1 wherein the attachment locations are formed as arms extending from the attachment base.

4. The rotating light of claim 3 wherein the anchors are formed as loops having an inner height H that the arms extend through.

5. The rotating light of claim 1, wherein the magnets are mounted in rings formed into the base gasket.

6. The rotating light of claim 5, wherein energy director caps are mounted over the magnets.

7. A flexible attachment device comprising:
a main housing having a stationary base;
said stationary base comprising a flexible attachment means functioning to support a lower base gasket which contains a plurality of magnets along its smooth bottom surface; and
wherein said lower base gasket has a resiliency sufficient to allow various sections therefore to move at different distances from the stationary base when the magnets attach to an uneven surface.

8. The apparatus of claim 7, wherein the flexible attachment means further comprises the lower base gasket connected to the stationary base by means of a plate with extending arms, wherein the extending arms hook to anchors on a top of the lower base gasket, and a connector fastens the lower base gasket to the stationary base with the plate sandwiched therebetween.

9. The apparatus of claim 8, wherein the anchors further comprise U shaped inverted loops.

10. The apparatus of claim 7, wherein the lower base gasket further comprises a plurality of annular collars along its top periphery serving as mounts for the plurality of magnets.

11. The apparatus of claim 9, wherein the lower base gasket has a pull tab to ease a removal of the lower base gasket from a working surface.

12. A rotating searchlight comprising:
a housing means functioning to support a light and a rotation means;
a stationary base means functioning to support the housing means to enable an axial rotation of the housing means on the stationary base means;
a flexible attachment means connected under the stationary base means and functioning to allow a lower gasket means to flex and conform to a working surface therebelow; and
wherein a plurality of magnets in the lower gasket means can form the lower gasket means to an uneven working surface.

13. The apparatus of claim 12 further comprising a wave washer between the housing means and the stationary base.

14. The apparatus of claim 12, wherein the flexible attachment means further comprises the lower base gasket means connected to the stationary base means by means of a plate with extending arms, wherein the extending arms hook to anchors on a top of the lower base gasket means, and a connector fastens the lower base gasket means to the stationary base means with the plate sandwiched therebetween.

15. The apparatus of claim 14, wherein the anchors further comprise U shaped inverted loops.

16. The apparatus of claim 14, wherein the lower base gasket means further comprises a plurality of annular collars along its top periphery serving as mounts for the plurality of magnets.

17. The apparatus of claim 12, wherein the lower base gasket means has a pull tab to ease a removal of the lower base gasket means from a working surface.

* * * * *